US012718591B2

(12) United States Patent
Jo et al.

(10) Patent No.: US 12,718,591 B2
(45) Date of Patent: Aug. 25, 2026

(54) METHOD AND APPARATUS WITH TRAFFIC LIGHT RECOGNITION MODEL

(71) Applicant: SAMSUNG ELECTRONICS CO., LTD., Suwon-si (KR)

(72) Inventors: Dae Ung Jo, Suwon-si (KR); Jaewook Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 18/602,299

(22) Filed: Mar. 12, 2024

(65) Prior Publication Data

US 2025/0166393 A1 May 22, 2025

(30) Foreign Application Priority Data

Nov. 22, 2023 (KR) ........................ 10-2023-0163309

(51) Int. Cl.
*G06V 20/58* (2022.01)
*G06V 10/25* (2022.01)
(Continued)

(52) U.S. Cl.
CPC ............ *G06V 20/584* (2022.01); *G06V 10/25* (2022.01); *G06V 10/32* (2022.01); *G06V 10/763* (2022.01)

(58) Field of Classification Search
CPC ...... G06V 20/584; G06V 10/25; G06V 10/32; G06V 10/763; G06V 10/764; G06V 10/82;
(Continued)

(56) References Cited

U.S. PATENT DOCUMENTS

2017/0337435 A1* 11/2017 Uliyar .............. G06V 30/19173
2021/0117730 A1* 4/2021 Alsallakh ................ G06T 11/00
(Continued)

FOREIGN PATENT DOCUMENTS

KR 10-2021-0039245 A 4/2021
KR 10-2528716 B1 5/2023

OTHER PUBLICATIONS

Li, Ziyue, et al. "An improved traffic lights recognition algorithm for autonomous driving in complex scenarios." International Journal of Distributed Sensor Networks 17.5 (2021): 15501477211018374. (Year: 2021).*

(Continued)

*Primary Examiner* — Henok Shiferaw
*Assistant Examiner* — Dion J Satcher
(74) *Attorney, Agent, or Firm* — NSIP Law

(57) ABSTRACT

Disclosed is a method of detecting a traffic light with an object recognition model configured to recognize traffic lights. The method includes: obtaining an input image from a camera included in a vehicle, the input image among frames, including previous frames, captured by the camera; estimating, based on prior information about traffic light objects, a first region of interest (RoI) for the input image; determining a second RoI based on the first RoI and based on detection results of the previous frames, wherein the detection of results correspond to recognition results of recognizing traffic lights in the previous frames by the object recognition model; and recognizing, by the object recognition model, a traffic light in the input image, wherein the recognizing is based on the input image and the second RoI.

18 Claims, 12 Drawing Sheets

(51) Int. Cl.
*G06V 10/32* (2022.01)
*G06V 10/762* (2022.01)

(58) Field of Classification Search
CPC ........ G06V 10/14; G06V 10/762; G06T 7/73; G06T 2207/10016; G06T 2207/20081; G06T 2207/20084; G06T 2207/20132; B60W 40/02; B60W 2420/403; B60W 2555/60; B60Y 2400/3015
USPC .......................................................... 382/104
See application file for complete search history.

(56) References Cited

U.S. PATENT DOCUMENTS

| | | | | |
|---|---|---|---|---|
| 2021/0181758 | A1* | 6/2021 | Das | G06F 18/25 |
| 2021/0303886 | A1* | 9/2021 | Hassan | G06N 3/09 |
| 2021/0383120 | A1* | 12/2021 | Zhou | G06T 7/248 |
| 2022/0114888 | A1 | 4/2022 | Napanda et al. | |
| 2022/0289372 | A1* | 9/2022 | Pescaru | G05D 1/1064 |
| 2023/0068046 | A1* | 3/2023 | Bush | B60W 60/001 |
| 2023/0147434 | A1 | 5/2023 | Mitchell et al. | |

OTHER PUBLICATIONS

Wang, Jinwang, et al. "A normalized Gaussian Wasserstein distance for tiny object detection." arXiv preprint arXiv:2110.13389 (2021).

Yang, Chenhongyi, Zehao Huang, and Naiyan Wang. "Querydet: Cascaded sparse query for accelerating high-resolution small object detection." *Proceedings of the IEEE/CVF Conference on computer vision and pattern recognition*. 2022.

Akyon, Fatih Cagatay, Sinan Onur Altinuc, and Alptekin Temizel. "Slicing aided hyper inference and fine-tuning for small object detection." *2022 IEEE International Conference on Image Processing* (*ICIP*). IEEE, 2022.

Xu, Chang, et al. "RFLA: Gaussian receptive field based label assignment for tiny object detection." *European conference on computer vision*. Cham: Springer Nature Switzerland, 2022.

Kos, Aleksandra, Karol Majek, and Dominik Belter. "Where to look for tiny objects? ROI prediction for tiny object detection in high resolution images." *2022 17th International Conference on Control, Automation, Robotics and Vision* (*ICARCV*). IEEE, 2022.

* cited by examiner

METHOD AND APPARATUS WITH TRAFFIC LIGHT RECOGNITION MODEL

CROSS-REFERENCE TO RELATED APPLICATIONS

This application claims the benefit under 35 USC § 119 (a) of Korean Patent Application No. 10-2023-0163309, filed on Nov. 22, 2023, in the Korean Intellectual Property Office, the entire disclosure of which is incorporated herein by reference for all purposes.

BACKGROUND

1. Field

The following description relates to a method and apparatus with a traffic light recognition model.

2. Description of Related Art

A system in which automobiles, aircraft, robots, or other platforms operate by themselves without the real-time instructions of humans may be referred to as an autonomous driving system. The implementations and operations of an autonomous driving system may be generally divided into three stages: recognition, determination, and control. The recognition stage is used to recognize a surrounding environment using a sensor mounted to a platform, the determination stage is used to determine a behavior of the platform by using a recognized result and to generate a driving path, and the control stage may be used to control the platform such that the platform moves along the generated path. At the recognition stage, a traffic light recognition result of an autonomous vehicle may be used to set a path of the autonomous vehicle. Since there are numerous traffic lights in a city driving situation, the accurate recognition of traffic lights may be beneficial for effective driving.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating an object recognition model configured to recognize traffic light objects includes: obtaining an input image from a camera included in a vehicle, the input image among frames, including previous frames, captured by the camera; estimating, based on prior information about traffic light objects, a first region of interest (RoI) for the input image; determining a second RoI based on the first RoI and based on detection results of the previous frames, wherein the detection of results correspond to recognition results of recognizing traffic lights in the previous frames by the object recognition model; and recognizing, by the object recognition model, a traffic light in the input image, wherein the recognizing is based on the input image and the second RoI.

The recognizing the traffic light may include: obtaining a target image by extracting a portion of the input image corresponding to the second RoI; and enlarging the target image to a size corresponding to a size of the input image, wherein the recognizing by the object recognition model is further based on the enlarged target image.

The prior information about traffic light objects may include: distribution data corresponding to a distribution of locations of previous observations of traffic lights selected based on having a size less than a threshold value.

The prior information about traffic light objects may further include information on the first RoI generated based on the distribution data.

The prior information about traffic light objects may include driving environment information on an environment in which the vehicle is driving and a specification of the camera.

The estimating the first RoI may further include adjusting the first RoI based on information from a sensor of the vehicle.

The estimating the first RoI may further include adjusting the first RoI based on a specification of the camera.

The determining of the second RoI may include: aggregating the detection results of the previous frames; obtaining centers of clusters of the detection results of the previous frames; filtering the centers; and obtaining the second RoI based on the filtered centers.

The aggregating the detection results of the previous frames may include maintaining detection results of a rolling window of the previous frames, the rolling window including a time window or a window defined by a number of previous frames.

The determining the second RoI may include: obtaining a distance function between the centers; removing centers that do not satisfy a minimum condition in the distance function; and determining the second RoI based on centers that satisfy the minimum condition.

In another general aspect, an electronic device may include: a camera; one or more processors; and a memory storing instructions configured to cause the one or more processors to: obtain an input image from the camera; estimate, based on prior information about traffic light objects, a first region of interest (RoI) for the input image; determine a second RoI based on the first RoI and based on detection results of previous frames of the camera, wherein the detection of results of the previous frames correspond to recognitions results of recognizing traffic lights in the previous frames by an object recognition model configured to recognize traffic lights; and recognize, by the object recognition model, a traffic light in the input image, wherein the recognizing is based on the input image and the second RoI.

The instructions may be further configured to cause the one or more processors to obtain a target image by extracting a portion of the input image corresponding to the second RoI and enlarging the target images to a size corresponding to a size of the input image and input the target image to the detector, wherein the recognizing by the object recognition model is further based on the enlarged target image.

The prior information may include: distribution data corresponding to a distribution of locations of previous observations of traffic lights selected based on having a size less than a threshold value; and wherein the prior information may further include information on the first RoI generated based on the distribution data.

The electronic device may be included in a vehicle, and the instructions may be further configured to cause the one or more processors to adjust the first RoI based on a sensor of the vehicle and according to a driving environment of the autonomous vehicle.

The instructions may be further configured to cause the one or more processors to aggregate the detection results of the previous frames in chronological order thereof, obtain centers of clusters of the detection results of the previous frames, and remove some of the centers and determine the second RoI based thereon.

The instructions may be further configured to cause the one or more processors to update the detection results of the previous frames to include a result of the recognizing of the traffic light in the input image, and the updated detection results may be used for recognizing a traffic light in a next input image captured by the camera.

The instructions may be further configured to cause the one or more processors to obtain a distance function between the centers, remove the centers except for centers that satisfy a minimum condition in the distance function, and place the second RoI in relation to a remaining center that satisfies the minimum condition.

In another general aspect, a method performed by a computing device includes: receiving input images captured by a camera of a moving vehicle; for a first of the input images, determining a first region of interest (RoI), wherein the first RoI is determined based on historical traffic light observations; inputting, to an object recognition model configured to recognize traffic lights, the first input image and an enlargement of a region in the first input image defined by the first RoI, based on which the object recognition model infers a location of a first traffic light in the first input image; for a second of the input images captured after the first input image, determining a second RoI, wherein the second RoI is determined based on the location of the traffic light in the first input image; and inputting, to the object recognition model, the second input image and an enlargement of a region in the second input image defined by the second RoI, based on which the object recognition model infers a location, in the second input image, of the first traffic light or a second traffic light.

The method may further include: adjusting a position of the second RoI based on the first RoI or based on the historical traffic light observations.

The object recognition model may include a neural network and the inferred locations may include respective bounding boxes.

Other features and aspects will be apparent from the following detailed description, the drawings, and the claims.

Figure 1A:
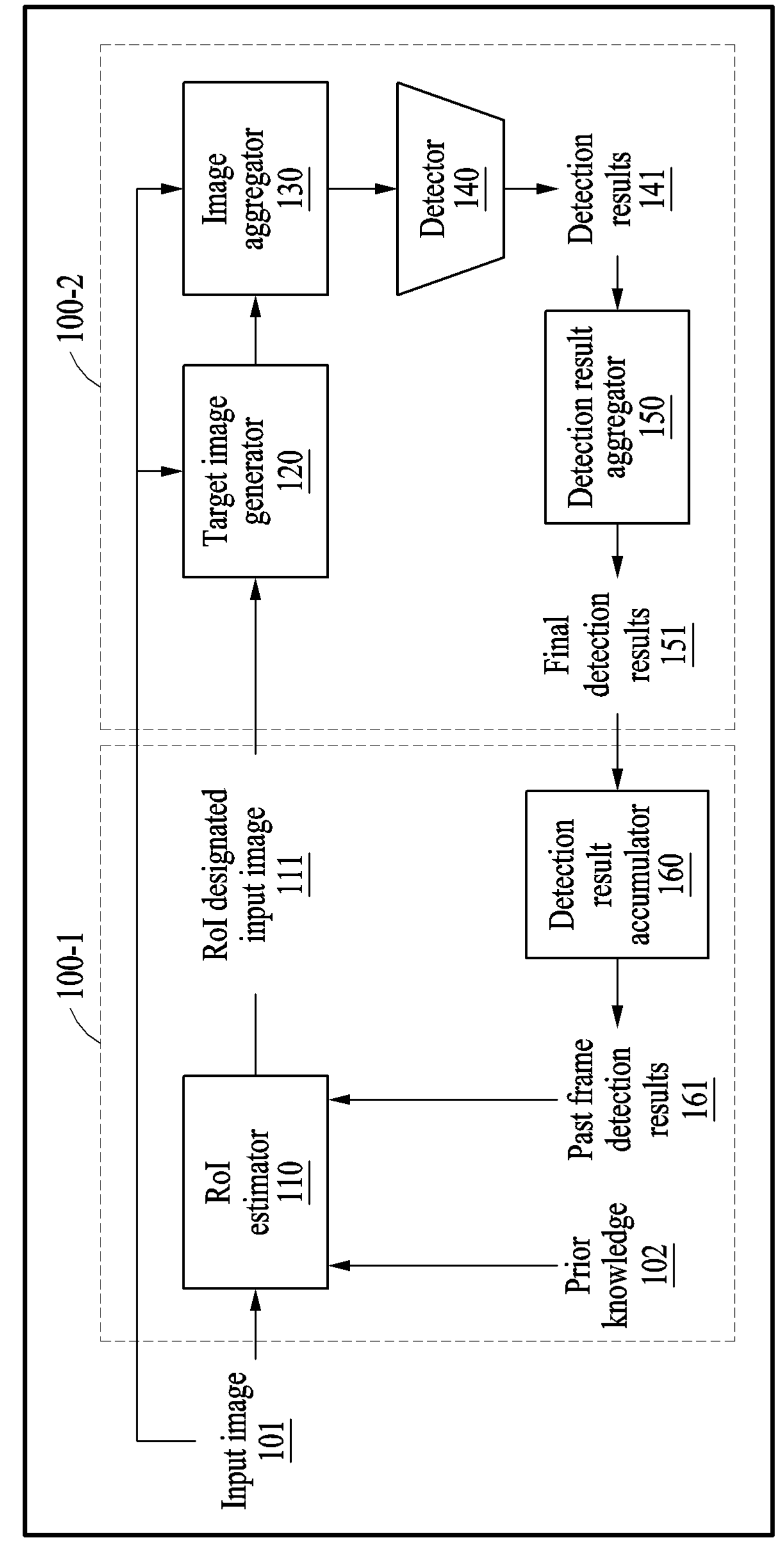
FIGS. 1A and 1B each illustrate an example of operating an object recognition model, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Object detection models and algorithms are often unreliable at detecting tiny objects in images. For example, in driving systems intended for use in vehicles driving on roads, detection of tiny objects is often the same as detection of distant objects (due to the perspective effect), which, in terms of a moving vehicle, is the same as early detection of objects. In driving systems, it may be beneficial to accurately detect distant objects as soon as possible, because the early detection of distant small objects may enable more accurate and effective decision making, path planning, and so forth. However, with perspective, the more distant an object the smaller the object is in an image captured by a camera. Traffic lights are one type of object commonly targeted for detection in driving systems. Detection of traffic lights can be important for driving functions for which early detection may be beneficial. In a typical vehicle's sensing system (cameras, RADARs, etc.) a front-facing camera may be used to capture images in the travel path of the vehicle. In this example scenario, detection of traffic lights roughly 70 to 100 meters ahead of the vehicle can be particularly beneficial. However with a typical camera, at that distance the image of a traffic light in a driving image may be tiny in a driving image and therefore difficult to detect.

A tiny object may be, for example, an object that is around 16 pixels (px)×16 pixels or less (although practically, the dimension at which detection becomes unreliable will vary from system to system). Since the number of pixels expressing the object is small, the amount of image information is small, and thus, the object may not be amenable to object detection as it may be unlikely to be distinguished from the background. One reason, for example, may relate to how object detection is often performed. Object detection models/algorithms may determine bounding boxes of objects in an image. As there are often many bounding boxes, even for the same object in an image, techniques have been used to consolidate or filter out redundant or unwanted bounding boxes. For example, the intersection of union (IoU) is a known measure of degree of overlap of two bounding boxes. Training of an object detection model may involve computing the IoU of a ground truth (GT) bounding box with a predicted bounding box. However, for small objects, small deviations between a GT box and a predicted box (e.g., 2 pixels) significantly decrease the IoU. Because of the rigidity of IoU and similar methods, object detection (and training for object detection) of distant/small objects can be poor, and small objects are often not detected or well-trained for. That is, even a slight difference in prediction may decrease an intersection of union (IoU), and training/detection may not be readily available. In addition, even when a person manually labels small objects for training, the objects may be easily mislabeled or missed, which may also degrade training.

To address the small object detection problem, learning-based methods may be adapted to improve or emphasize training and performance of an object recognition model. However, learning-based methods that are adapted to emphasize detecting tiny objects may become poorer at detecting large objects or have other shortcomings. Since, in a driving situation, large objects such as vehicles may need to be detected together with small objects like traffic lights, the overall performance of small-object-focused detection models may decrease and may cause a defect in an autonomous vehicle. In addition, to ensure the learning-based methods operate properly, a ground truth label for a tiny object may need to be given accurately. However, as noted, in practice, tiny objects may be mislabeled or missed. In addition, there may be no training data that accounts for a new driving situation. Accordingly, although adapting to a current situation is required for autonomous vehicles, previous learning-based methods have generally had limitations on data robustness.

The description of embodiments and examples disclosed herein may include a method of detecting small objects, for example a traffic light, through an object recognition model used in a driving situation. Although for description a traffic light is referenced herein as a target object (target for object detection), the embodiments and examples described herein may be applied to any type of small object, in particular, when such objects have predictable/consistent statistical patterns of appearance in driving images and/or when a target object may move in a sequence of frames (e.g., due to vehicle movement). Moreover, although autonomous driving is mentioned as an example application, the embodiments and techniques described herein may be used in any object detection scenario or application where small object detection may be expected.

Figure 1B:
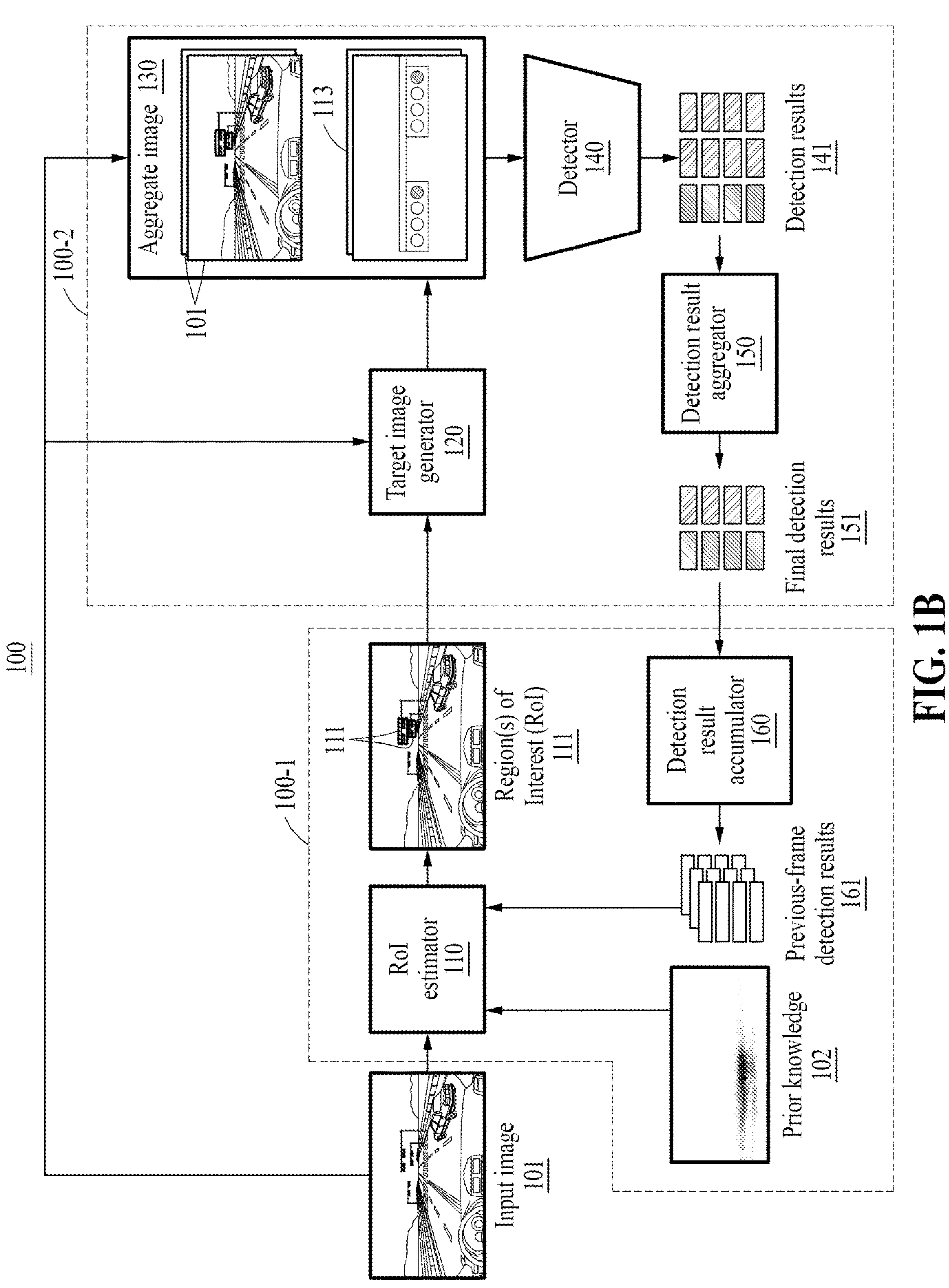

FIGS. 1A and 1B each illustrate an example of operating an object recognition model 100, according to one or more embodiments.

As illustrated in FIGS. 1A and 1B, one or more blocks and a combination of the blocks may be implemented by a special-purpose hardware-based computer that performs a predetermined function or a combination of computer instructions and special-purpose hardware. Hardware may be configured to any of the purposes and functions by the loading and executing of processor-executable instructions, for example.

Referring to FIGS. 1A and 1B, a "block" or "module" may be, for example, a unit including one or a combination of two or more of hardware, software, or firmware. The term "block" may be interchangeably used with terms, such as, for example, a unit, a logic, a logical block, a component, or a circuit. A block may be a minimum unit of an integrally formed component or part thereof. A block may be a minimum unit for performing one or more functions or part thereof. A block may be a unit of execution abstraction or data abstraction, for example, a neural network model or component thereof, an image, a feature map, an inference result, and so forth. For example, a block may include any one or any combination of an application-specific integrated circuit (ASIC) chip, field-programmable gate arrays (FPGAs), a programmable-logic device, or an algorithm driven by a processor 1030 that performs known operations or operations to be developed.

A system (e.g., an electronic device 1000 of FIG. 10) of an autonomous vehicle, for example, may include the processor 1030 (e.g., the processor 1030 of FIG. 10) that executes the object recognition model. The processor 1030 may perform operation 100-1 of estimating a region of interest (RoI) and operation 100-2 of estimating an object according to a result of operation 100-1.

The object recognition model may be used to detect and identify (recognize) a certain/target object in an image or a video. The object recognition model may accurately determine the position and type of an object by combining deep learning with computer vision technology. The object recognition model may use, as constituent components, any of various types of known object recognition models, such as You Only Look Once (YOLO), a faster region-based convolutional neural network (R-CNN), or a single shot multibox detector (SSD), to name some examples (for example for the detector 140). The processor 1030 of the autonomous vehicle may drive the object recognition model such that it may be effectively used in real time.

In the descriptions below, the object recognition model may be assumed to include a traffic light detection model that has been (or is being) trained through the traffic light training data.

The processor 1030 may input an input image 101, prior knowledge 102, and previous-frame detection results 161 to an RoI estimator 110 and based thereon (e.g., one or the other) may obtain RoIs 111. The processor 1030 may input the input image 101 and the RoIs 111 to a target-image generator 120 which may generate target images 113 based on the respective RoIs 111 (one target RoI and one target image are possible). The RoIs 111 in FIG. 1B are shown relative to the input image 101; in practice the RoI estimator may not output an image but rather outputs the RoIs in the form of, for example, sizes and positions thereof (relative to the input image 101).

The target images 113 may be, for example, enlargements of the RoIs 111 taken from (cut from) the input image 101 (as inputted to the target image generator 120). That is, sub-images of the input image 101 defined by (within) the respective RoIs 111 may be extracted and upscaled to form the target images 113 (possibly matching the size of the input image 101). The processor 1030 may aggregate the input image 101 and the target images 113 into an aggregate image 130 (e.g., by concatenation). The aggregated image 130 may be inputted to a detector 140. The processor 1030 may apply the detector 140 to the aggregated image 130 to generate detection results 141 that are outputted from the detector 140.

The detection results 141 may be inputted to the detection result aggregator 150, which, based thereon, may generate and output final detection results 151, information of which, as briefly explained next, may contribute to RoI estimation performed by the RoI estimator 110 on an input image after the input image 101. The final detection results 151 may be used for various driving functions mentioned above, for example, path planning, decision making, assisted driving, display of information to a driver, etc. Additionally, the processor 1030 may add at least some of the final detection results 151 into a collection of previous-frame detection results 161, which it may do by inputting the final detection results 151 to a detection result accumulator 160 which may decide a portion (if any) of the final detection results 151 to incorporate into the previous-frame detection results 161, and which may also "roll off" previous-frame detection results as the expire (become too old). The previous-frame detection results 161 may include final detection results corresponding to multiple frames that preceded the input image 101. For example, the previous-frame detection results 161 may correspond to a moving window of previous detection results (e.g., 10 most recent frames). However, it is possible that the previous-frame detection results 161 may become empty due to lack of detection results (e.g., no traffic lights detected) or the detection result accumulator 160 repeatedly not selecting any of the final detection results for including in the previous-frame detection results 161. In that circumstance, the RoI estimator 110 may estimate RoIs without any previous-frame detection results, e.g., based only on the prior knowledge 102. When previous-frame detection results are available, they may be used to adjust or update baseline RoIs of the prior knowledge 102. Operations of the processor 1030 described above are described in detail with reference to FIG. 2.

Figure 2:
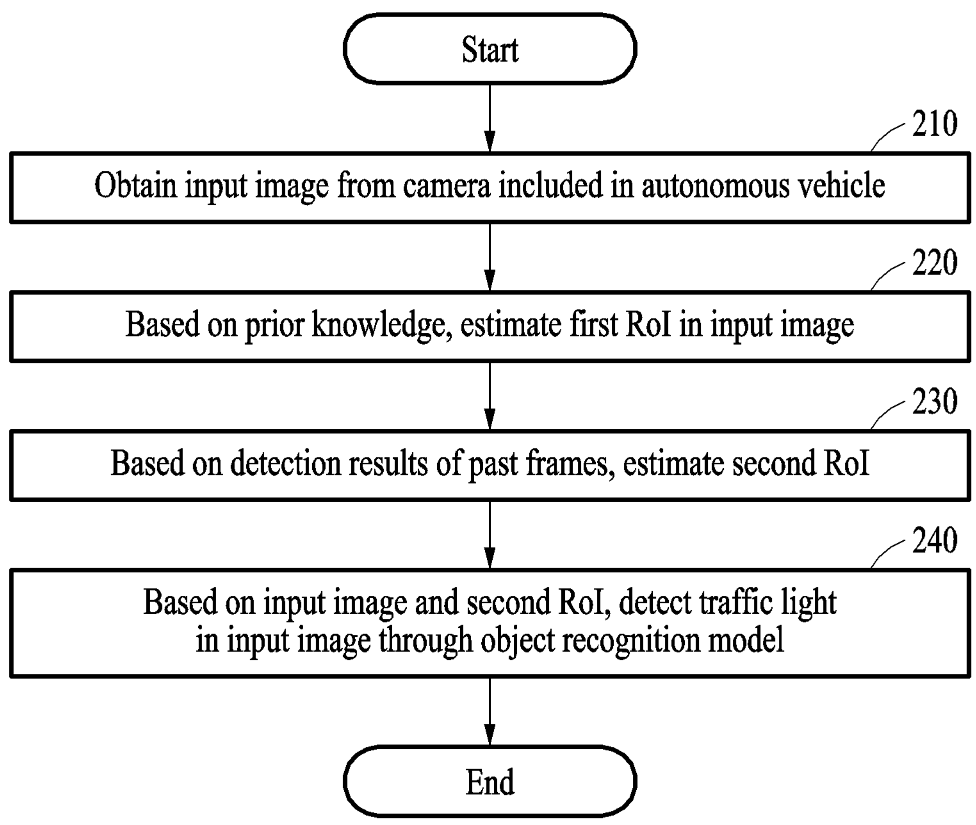
FIG. 2 illustrates an example method of the object recognition model, according to one or more embodiments.

FIG. 2 illustrates an example method of the object recognition model, according to one or more embodiments.

The description provided with reference to FIGS. 1A and 1B is generally applicable to FIG. 2.

Figure 10:
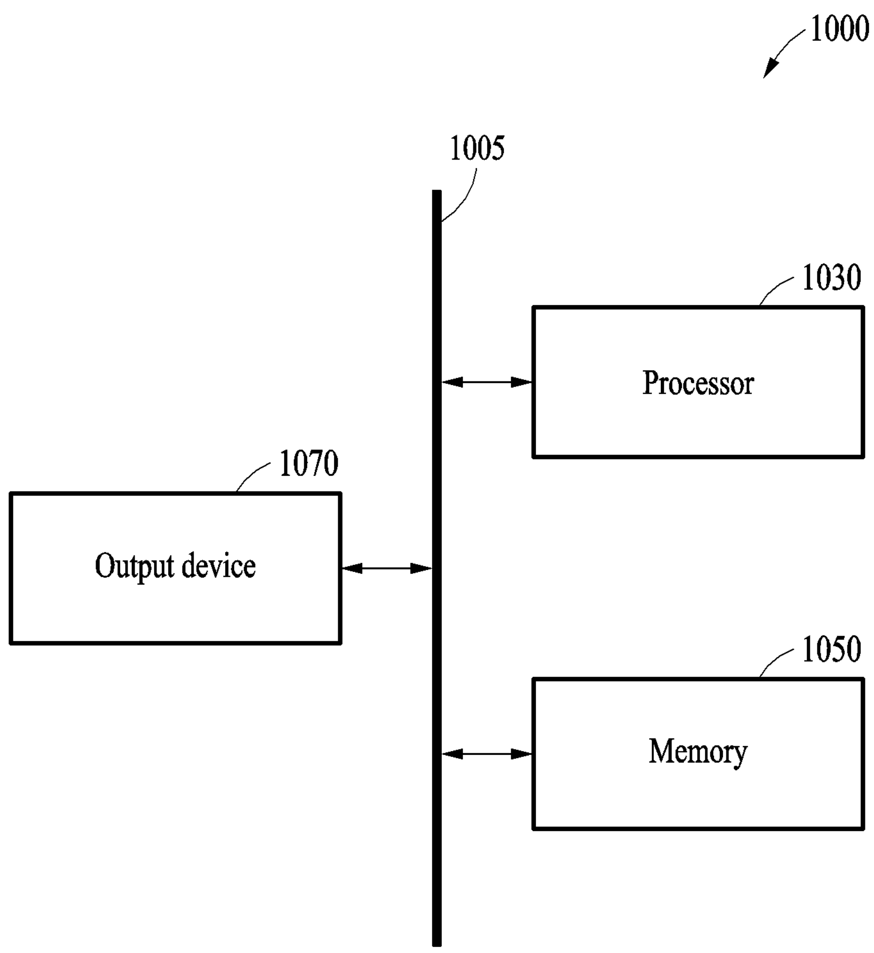
FIG. 10 illustrates an example electronic device, according to one or more embodiments.

For ease of description, it is described that operations 210 to 240 are performed by using the processor 1030 illustrated in FIG. 10. However, operations 210 to 240 may be performed by another suitable electronic device in any suitable system.

As an overview, FIG. 2 shows operations 220 and 230 of using, respectively prior knowledge and results of past frames to form RoIs which are used to focus object detection in operation 240. Generally, for one given input image, operation 220 may be performed to generate first RoIs based on prior knowledge (a baseline/default assumption about the statistically likely image locations of small/distant objects like traffic lights), and operation 230 may be performed to summarize the locations of recent object detections and update (e.g., move, omit, consolidate, etc.) the first RoIs to form second RoIs that are used for object detection. If there are insufficient recent object detections (e.g., previous-frame detection results 161) for the given input image, then the first RoIs may be used without adjustment. Regardless of whether there are previous-frame detection results, the first/default RoIs may be updated (e.g., moved, resized, etc.) based on current driving conditions, for example pose of the vehicle, location of the vehicle, etc.

Returning to FIG. 2, In operation 210, the processor 1030 may obtain the input image 101 from a camera included in an autonomous vehicle. The camera may be/include various types of cameras. The cameras may continuously sense the vicinity of the vehicle and may collect important information during driving to assist the vehicle in driving, for example. The autonomous vehicle may include a front camera, a rear camera, an internal camera, and/or a night vision camera (e.g., infrared). In this case, the autonomous vehicle may generally use the front camera to detect a traffic light and the input image 101 may be from the front camera. The front camera may be a camera installed in the front of the vehicle and may capture driving images and videos to monitor a road situation and detect obstacles, traffic lights, or lanes in front of the vehicle, for example. To that end, the processor 1030 may obtain an input image from the front camera and may perform object recognition in real time.

In operation 220, the processor 1030 according to an embodiment, based on prior knowledge (discussed next), may estimate first RoI(s) (e.g., first RoIs 411, 412, and 413 of FIG. 4) in the input image 101. The RoI estimator 110 according to an embodiment, with the prior knowledge as an input, may estimate the first RoI(s) in the input image 101.

The prior knowledge 102 may include, be based on, or reflect, statistical distribution data of image-locations of previously recorded target traffic lights. Generally, the prior knowledge 102 may be statistical collation of where a particular camera pose of a vehicle camera most often has "seen" a particular type of object (e.g., traffic light), perhaps constrained to "sightings" that meet a particular condition that is relevant to the intended object-detection scenario (e.g., detecting frontward traffic lights in at a certain range of distance). More specifically, the prior knowledge 1012 may be obtained by extracting/compiling a distribution (e.g., a distribution 400 of target traffic lights) of the image-locations of target traffic lights of which the pixel value is less than or equal to a threshold value in image data obtained from a driving history, for example, test-driving environments, data captured from a fleet of vehicles where early/distant observations are later confirmed as true, and so forth. An inclusion threshold value or condition may be a value (possibly dependent on traits of the camera of the autonomous vehicle) that a target traffic light's pixel value/size must be less than or equal to be included in or contribute to the prior knowledge 102. For example, a target traffic light in 70 to 100 meters (m) from the autonomous vehicle may be recognized as about 16 px in an image of the camera, and thus, 16 px may be set to the threshold value. In addition, the prior knowledge 102 may be/include the information on the first RoIs generated based on the distribution data of the target traffic lights. In other words, the prior knowledge 102 may be the first RoIs themselves, which are generally static (although, as described elsewhere herein, may be swapped and/or adjusted). The distribution of the target traffic lights is described in detail below with reference to FIG. 4.

Although the prior knowledge 102 may generally remain static, it is possible to update the prior knowledge 102 in response to changing driving conditions. For example, there may be instances of prior knowledge 102 for respective geographic regions, in particular, regions having different statistical distributions of traffic lights, due to different ways traffic lights may be placed (relative to roads) and mounted (e.g., high or low, overhead or on corner, etc.). Information of the current geographic location of the autonomous vehicle may be used to swap in prior knowledge 102 corresponding to the current location.

The prior knowledge 102 may include driving environment information about an environment where the autonomous vehicle is driving and the specification of the camera included in the autonomous vehicle, which may be used to more accurately generate or adjust the first RoIs from the prior knowledge 102.

More specifically, the processor 1030 according to an embodiment may facilitate correction/adjustment of the first RoIs (per the prior knowledge 102) by using a sensor (e.g., a tilt/orientation sensor such as a gyroscope) of the autonomous vehicle that senses driving environment of the autonomous vehicle or state of the autonomous vehicle (e.g., 3D pose). In addition, the processor 1030 may facilitate correction/adjustment of the first RoIs based on the specification of the camera included in the autonomous vehicle. In one approach, such driving environment information about vehicle surroundings/environment, camera, vehicle state, etc. may be used to adjust the prior knowledge 102 (e.g., in the form of RoIs) so that it better corresponds to the input image 101, that is, so that the statistical information represented in the prior knowledge 102 aligns with input image 101. For example, if the sensor indicates that the autonomous vehicle is pitched forward (going downhill), the first RoIs may be adjusted/generated accordingly, e.g., shifted upwards, to put the first RoIs (relative to the input image) where traffic lights would be statistically expected at that viewing/camera angle. To summarize, dynamic and static driving environment information may be provided to the RoI estimator 110 as part of (or a supplement to) the prior knowledge 102 which may adjust estimate RoIs accordingly.

To elaborate, the driving environment information may include road and lane information, road state and weather information, a road geographic information system (GIS), navigation data, or information on road traffic regulations or installation positions of traffic lights. As noted above, the RoI estimator 110 may estimate the first RoI by using the driving environment information that is input as a supplement to the prior knowledge 102. For example, when information that an installation position of traffic lights on a current driving road is higher than a general position is input, the first RoI that is input as the prior knowledge 102 may be corrected such that the first RoI may be estimated to be a little higher.

The specifications of cameras used for the autonomous vehicle may vary depending on manufacturers or models but may be predetermined before being mounted to the autonomous vehicle. The specifications of cameras may generally include a resolution, a frame rate, a lens type and field of view, low light performance, an autofocus and adjustment, or a data transfer rate per second.

Although FIG. 1B shows an image of points as the prior knowledge 102 inputted to the RoI estimator 110, in practice the object recognition model 100 may pre-compute RoIs from the statistical prior knowledge (historical traffic locations) and re-use those pre-computed RoIs as the first RoIs. The RoI estimator 110 may update/adjust those first RoIs based on current environment and/or state of the autonomous vehicle. Such adjustments may include moving the first RoIs to align them with the current input image.

In addition, the RoI estimator 110 may correct the first RoIs according to the specifications of a camera. The prior knowledge 102 may include the distribution data of the target traffic lights and the information on the first RoI, which are predetermined according to the specification of the camera. However, for example, when the processor 1030 determines that a problem occurs in the camera in a real-time driving environment or a problem is caused by a day/night change in a resolution, the RoI estimator 110 may estimate the first RoI by adjusting the position and size of the first RoI that is input as the prior knowledge 102.

Figure 5:
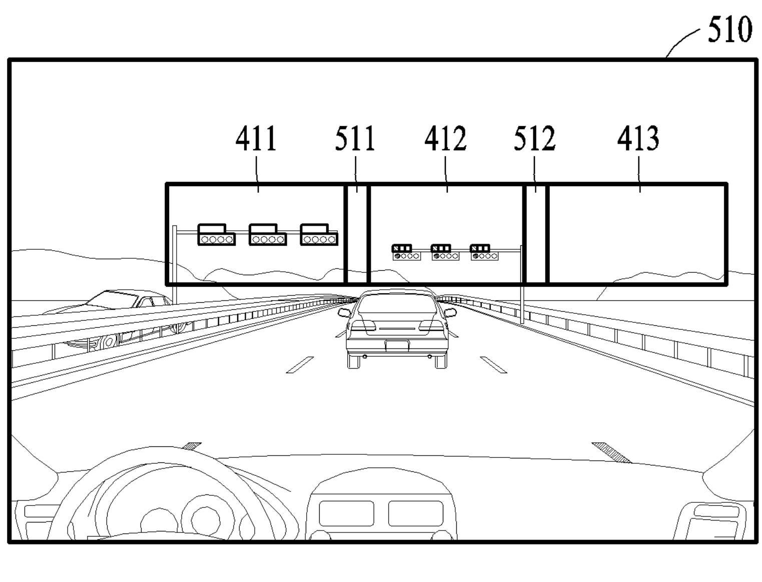
FIG. 5 illustrates an example of region of interest (RoI) updating relative to an input image, according to one or more embodiments.
Figure 5:
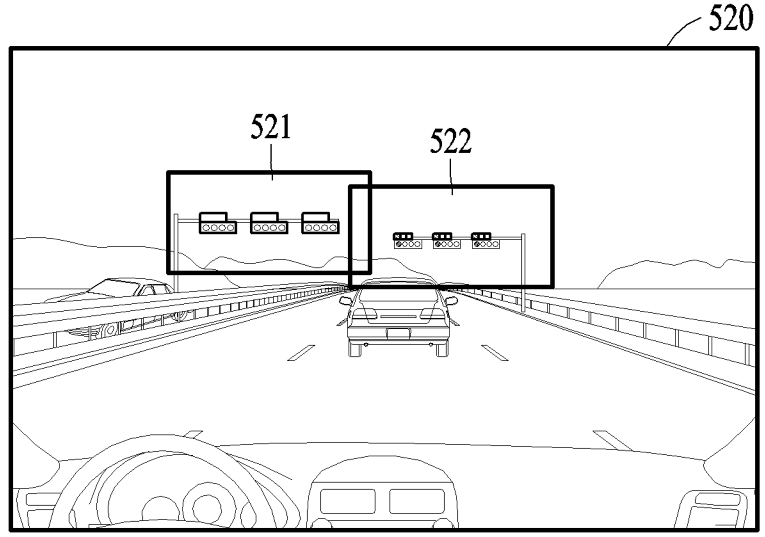

In operation 230, based on the previous-frame detection results 161 (when available), the processor 1030 may update the first RoIs to be second RoIs (e.g., second RoIs 521 and 522 of FIG. 5). For example, as described below, center-points of clusters of previous object detections (e.g., previous-frame detection results 161) may be used to steer the first RoIs towards areas of recent object detection by the object detection model.

A success rate of object detection for detecting target traffic lights may be sufficient using the first RoIs as estimated based on the prior knowledge 102. However, the first RoIs are based on a full statistical data distribution of the driving history (e.g., test-driving images) and thus may cover a region or portion of a current input image for which object detection is not currently needed. The unnecessary region/portion may add an unnecessary calculation, and thus, an operation speed of the object recognition model 100 may decrease. In general, frames of a driving image sequentially change, and thus, the position, size, and number of the first RoIs may be adjusted (to form the second RoIs) in real time by reflecting the detection results of past frames. In other words, the RoI estimator 110 may adjust the first RoIs and may update the first RoIs to the second RoIs.

The processor 1030 according to an embodiment may obtain previous-frame detection results 161 detected by the detector 140 in order from the most recent. The processor 1030 may accumulate and store the previous-frame detection results 161 until a predetermined number of the final detection results 151 (of respective previous input images) are accumulated, and then may begin discarding sufficiently old previous-frame detection results.

The detection result accumulator 160 may accumulate and aggregate the final detection results 151 in order from the most recent. In this case, the detection result accumulator 160 may store the final detection results 151 until the number of the past frame detection results 161 to be used in the RoI estimator 110 is greater than or equal to a predetermined number N (e.g., 50 frames). The RoI estimator 110 may estimate an RoI by using only the prior knowledge 102 when the number of the past frame detection results 161 of the detection result accumulator 160 is less than or equal to a predetermined number (e.g., N or a number less than N). That is, the RoI estimator 110 may make use of a less-than-maximum number of previous-frame detection results by may only use the previous-frame detection results when there as a threshold minimum number of the same.

The processor 1030 according to an embodiment may apply a clustering algorithm to the detection results of the previous frames to obtain representative centers of clusters of previous detection results. The RoI estimator 110 may update the first RoIs to the second RoIs when the number of the past frame detection results 161 is greater than or equal to the predetermined number N. The operation of updating to a second RoI may be performed through a method described below.

The RoI estimator 110 may obtain K representative centers through a clustering algorithm for center points of N detection results. In other words, the detection results 141 may be expressed in a bounding box form, and thus, the clustering algorithm may be applied to the center points of the detection results 141 bounding boxes. The clustering algorithm may the K-means algorithm or the density-based spatial clustering of applications with noise (DBSCAN) algorithm, to name some non-limiting examples.

The processor 1030 may filter the representative centers (e.g., using IoU) and obtain the second RoI.

The processor 1030 according to an embodiment may obtain a distance function between the representative centers. The processor 1030 may remove representative centers that do not satisfy a minimum condition in the distance function. The processor 1030 may generate the second RoI around the representative centers that satisfy the minimum condition.

The RoI estimator 110 may perform filtering on centers to reduce a region (overlap regions 511 and 512 of FIG. 5) in which RoIs for the plurality of representative centers excessively overlap with one another. First, a distance function for each of the representative centers may be obtained to perform filtering. Each of the centers may be denoted by $C=\{c_1, c_2, \ldots, c_N\}$, and $d(c_i, c_k)$ may be defined as a distance function (e.g., Euclidean distance) between two centers. The Euclidean distance may be a straight-line distance between two points. The Euclidean distance may be the generalization of the Pythagorean theorem. The Euclidean distance may be used to measure the "shortest distance" between two points. The Euclidean distance may also be used to measure a similarity between clusters in the K-means clustering algorithm, for example.

The RoI estimator 110 may designate $c_i$ as a candidate of removal when $$\min_{k \neq i} d(c_i, c_k) < \epsilon$$

for the center $c_i$ among the representative centers. In this case, a center that satisfies the minimum condition may be assumed to be $c_j$. If the minimum condition is not satisfied, $c_i$ may remain.

The RoI estimator 110 may remove $c_j$ when $$\min_{k \neq i,j} d(c_i, c_k) > \min_{k \neq i,j} d(c_j, c_k)$$

for $c_i$, which is designated as the candidate of removal, and may remove $c_i$ in an opposite case. The RoI estimator 110 may repeat the above process while increasing from i=1 to i=N.

The RoI estimator 110 may generate the second RoI based on representative centers filtered by repeating the above process. The RoI estimator 110 may update the first RoI according to the generated second RoI and may output the RoI designated input image 111.

The filtered centers of previous detection results may be used in a number of ways to form final (e.g., second) RoIs that are by the target image generator 120. In one implementation, when sufficient previous-frame results are available, the filtered centers may be used on their own as the bases for determining the locations of the second/final RoIs. For example, the second RoIs may be centered on the filtered centers and may have a predetermined dimension (or a dimension based on the prior knowledge). In another implementation, the second RoIs may be weighted blends of the first RoIs (prior knowledge based) and the filtered centers, with the filtered centers gaining more weight as the number of previous-frame results increases. In another implementation, the previous-frame results may be in the form of detection-result bounding boxes (of recognized traffic lights, for example), which may be enlarged and blended with the first RoIs. In yet another implementation, the first RoIs are used as the second/final RoIs when there are no/insufficient previous-frame results, and RoIs based on the filtered centers may be used as the second RoIs when the filtered centers are available.

In operation 240, the processor 1030 may detect a traffic light in the input image 101, based on the input image 101 and the second RoIs, by using the detector 140.

The processor 1030 according to an embodiment may obtain target images initially having sizes corresponding to the sizes of the second RoIs. The processor 1030 may enlarge the target images to the size of the input image. The processor 1030 input the input image 101 and the enlarged target images to the detector 140 for object detection thereby.

Figure 6:
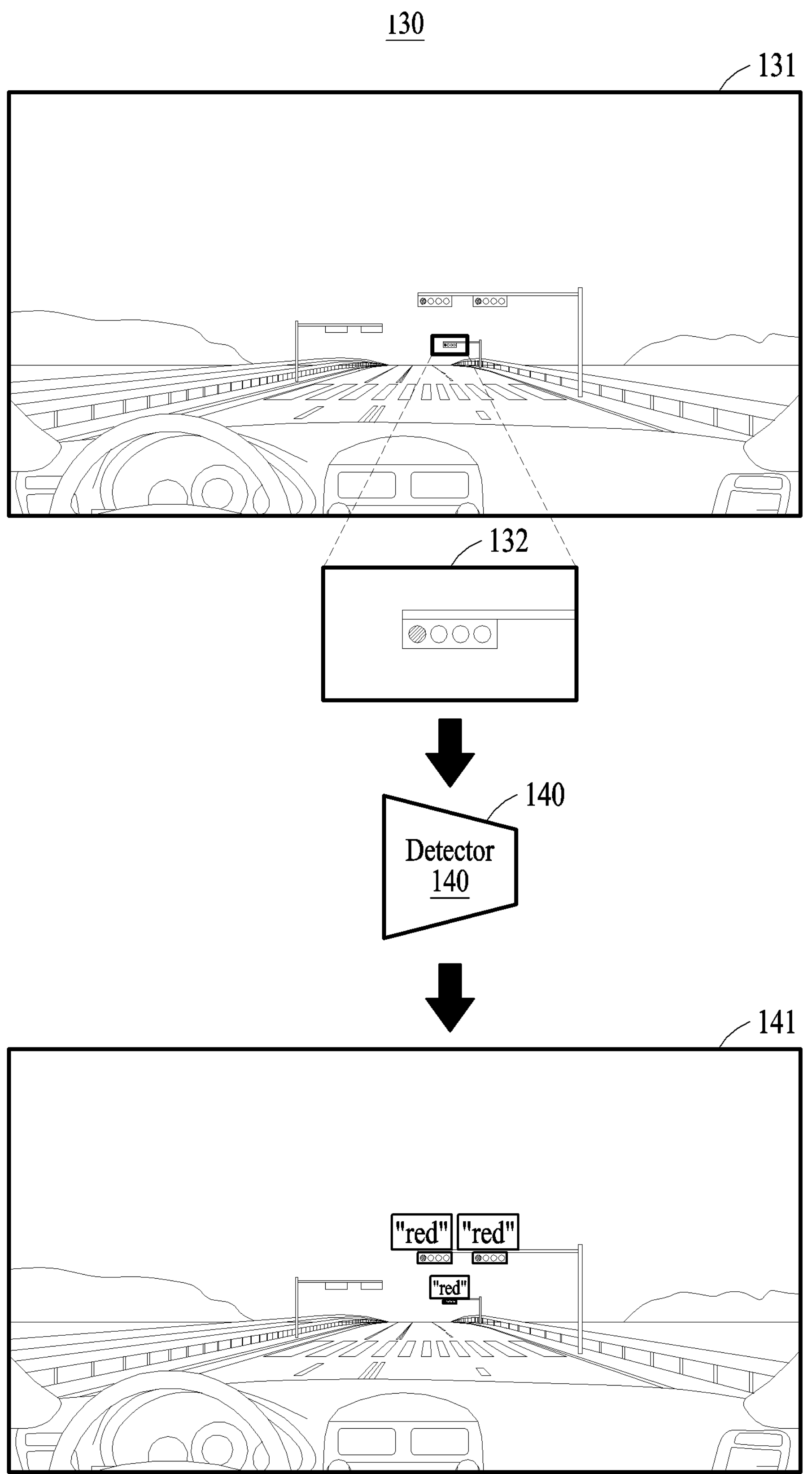
FIG. 6 illustrates an example operation of a detector, according to one or more embodiments.

The target image generator 120 may, for each second RoI, crop (copy) the area (sub-image) of the input image 101 targeted by the second RoI. The target image generator 120 may enlarge (e.g., upsample) cropped images (sub-images)

up to the size of the input image and may output a target image (e.g., a target image 132 of FIG. 6 or a target image 113 of FIG. 1B).

An image aggregator 130 (see FIG. 6) may aggregate the input image 101 and the target image and may input an aggregated image to the detector 140. There may be a target image formed for each RoI, respectively. For example, aggregation may be performed by concatenating the input image and the target images.

The detector 140 may receive the input image 101 and the target image (in aggregated form) from the image aggregator 130 and may output a detection result. The detector 140 may be/include a model configured to detect or recognize (e.g., by previous training) traffic lights from input images. Accordingly, the detector 140 may detect the traffic lights from the input image 101 and the target image. The detector 140 may perform the detection of the traffic lights on the input image 101 and the target image in parallel or in an input order and may also perform object detection for detecting vehicles, lanes, or the like together. The detection results 141 that are output from the detector 140 may be transmitted to the detection result aggregator 150. The detection results 141 may be, for example, bounding boxes with respective classification labels for detected objects.

The detection result aggregator 150 may aggregate the detection results 141 of the detector 140 and may output the final detection results 151. Since a target image generated by enlarging the second RoI is basically a part of the corresponding input image, there may be overlapping detection results stemming from detection in the input image and detection in the target image(s). Accordingly, the detection result aggregator 150 may perform an algorithm (e.g., a non-maximum suppression algorithm) for removing such overlapping results. The final detection results 151 that are output from the detection result aggregator 150 may be relayed to the detection result accumulator 160 and may be used to generate the next second RoI by the RoI estimator 110 vis-à-vis inclusion in the previous-frame detection results 161.

Figure 3:
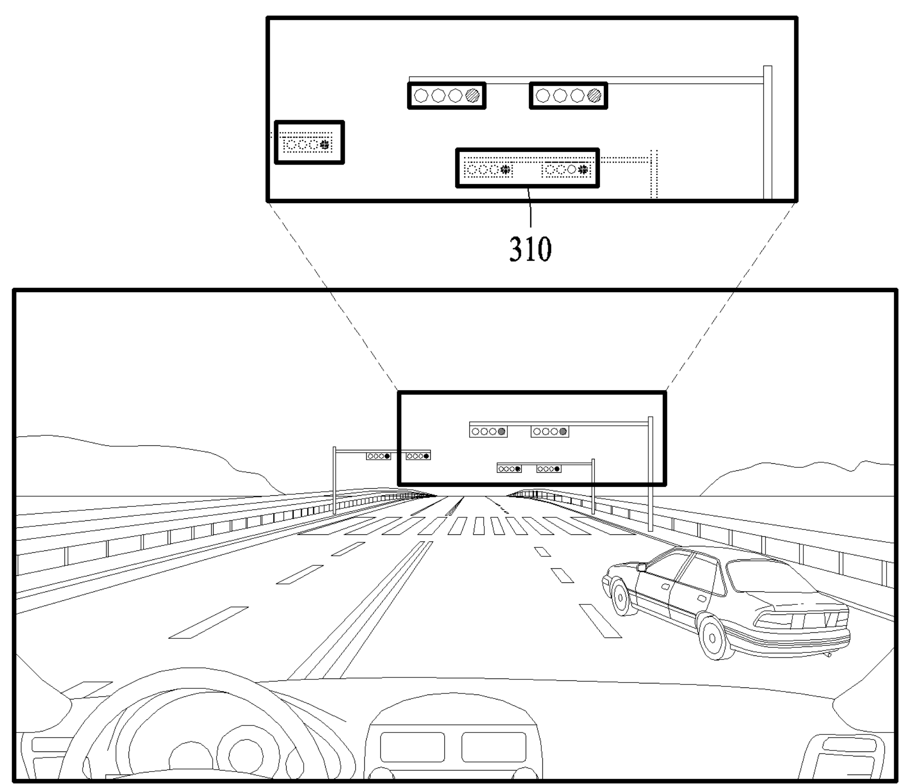
FIG. 3 illustrates an example of traffic light detection results, according to one or more embodiments.

FIG. 3 illustrates an example of traffic light detection results, according to one or more embodiments.

The description provided with reference to FIGS. 1A to 2 is generally applicable to FIG. 3.

Referring to FIG. 3, an object recognition model of general performance may have difficulty detecting a distant traffic light 310. In other words, the traffic light 310 approximately 70 to 100 m from a vehicle may be captured as an object of the traffic light 310 of about 10 px in a general camera. A method of performing object detection to find a tiny object may involve image enlargement. However, detecting the traffic light 310 by enlarging all of the image, instead of enlarging a limited region may be inefficient for a vehicle function (e.g., autonomous driving) that needs to respond to a changing driving situation in real time. Accordingly, detecting the traffic light 310 only by enlarging an RoI as described above with reference to FIGS. 1A to 2 may be efficient.

Figure 4:
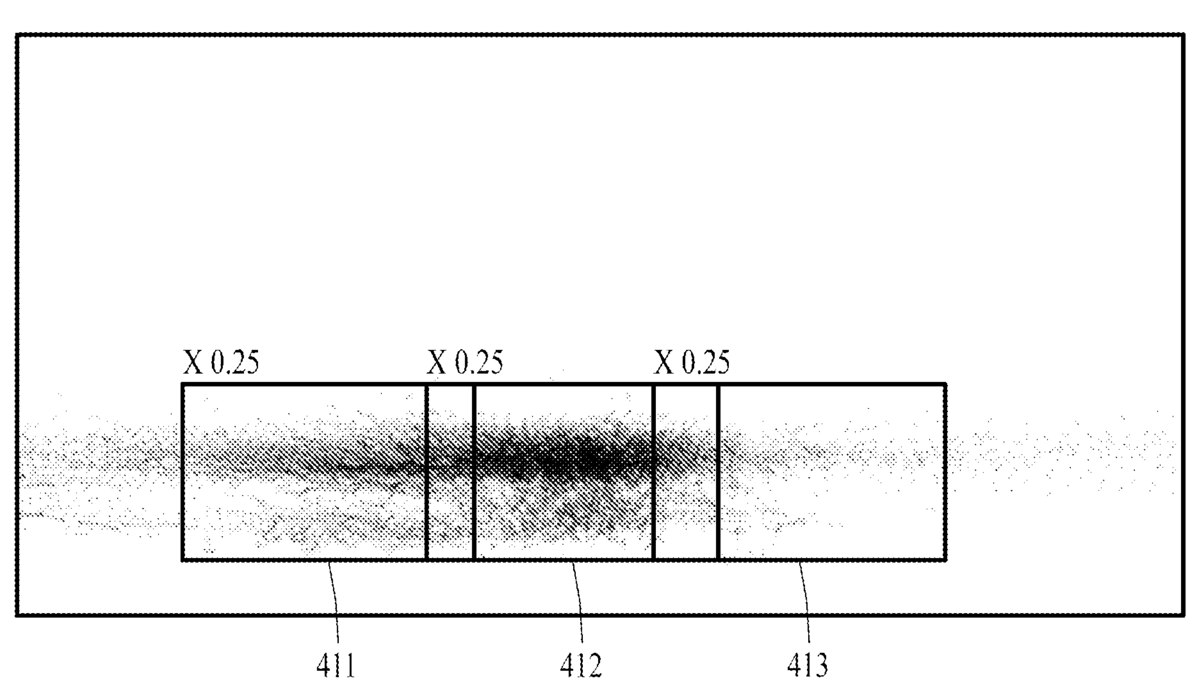
FIG. 4 illustrates an example distribution of target traffic lights, according to one or more embodiments.

FIG. 4 illustrates an example distribution of target traffic lights, according to one or more embodiments.

The description provided with reference to FIG. 1A to is generally applicable to FIG. 4.

The prior knowledge 102 may include data on the distribution 400 of target traffic lights, which is obtained by extracting the distribution 400 of target traffic lights of which a pixel value (e.g., area) is less than or equal to a threshold value in image data obtained in test-driving environments. In addition, the prior knowledge 102 may include the information on a first RoI (e.g., regions 411, 412, and 413) generated based on the data on the distribution 400 of target traffic lights.

The prior knowledge 102 may be a kind of scene/task specific knowledge. For an autonomous vehicle to quickly respond to a traffic flow in a driving situation in real time, it is helpful to detect a distant traffic light. Accordingly, the regions 411, 412, and 413 where distant target traffic lights are mainly distributed may be specified as baseline (or first) RoIs.

Since traffic lights are generally installed with certain standards and rules under traffic regulations, most target traffic lights may appear in the certain regions 411, 412, and 413 in a driving situation. The regions where the target traffic lights are distributed may be determined based on extrinsic factors (an installation position, a viewing angle, etc.) and intrinsic factors (a focal length, etc.) of a camera.

Referring to FIG. 4, the distribution 400 of target traffic lights, of which the height is less than or equal to 15 px, may be in an image having a 2560 px×1280 px size obtained in the test-driving environments.

If the processor 1030 is to detect target traffic lights based on a whole image, local regions having a ¼ size in width and height may be practically processable. However, 3 to 4 RoIs are sufficient if considering only regions including the target traffic lights. Accordingly, the regions including the target traffic lights may be defined and used as RoIs. In conclusion, the prior knowledge 102 may include the information on the first RoI including the information on the RoIs.

FIG. 5 illustrates an example of ROI updating relative to an input image, according to one or more embodiments.

The description provided with reference to FIGS. 1A to 2 and 4 is generally applicable to FIG. 5.

The RoI estimator 110 according to an embodiment may adjust the overlap regions 511 and 512 in an input image 510 where first RoIs are designated and may output an input image 520 where second RoIs are designated by updating the first RoIs.

The RoI estimator 110 may receive the first RoIs 411, 412, and 413 and may output the input image 510 where the first RoIs 411, 412, and 413 are designated. However, the input image 510 where the first RoIs 411, 412, and 413 are designated is determined according to a distribution of predetermined target traffic lights, and the first RoI 413 that is a region not including a traffic light and the overlap regions 511 and 512 may occur in an actual driving situation. Accordingly, the RoI estimator 110 may update the first RoIs 411, 412, and 413 to the second RoIs 521 and 522 through the method described above with reference to FIGS. 1A to 2.

FIG. 6 illustrates an example operation of the detector 140, according to one or more embodiments.

The description provided with reference to FIGS. 1A to 2 is generally applicable to FIG. 6.

Referring to FIG. 6, the detector 140 may receive an input image 131 and the target image 132 from the image aggregator 130 and may output the detection results 141. Here, the detection results are shown relative to the input image 131, however, in practice, the detection results 141 may be indications of detections of the target object (e.g., traffic lights). For example, the detection results 141 may be in the form of bounding boxes and respective labels inferred/predicted by the detector 140. The detector 140 may include a general object recognition model and may include a traffic light detection model for an autonomous vehicle, for example, to detect a traffic light and identify a traffic signal state (e.g., a red light, a green light, a left turn, etc.). For example, generally, the detector 140 may receive input data and may convert the input data (e.g., the input image 131 and the target image 132) through preprocessing into a format that may be input to the object recognition model of the detector 140. The preprocessing may include image resizing, normalization, and/or data augmentation. Then, the detector 140 may extract a feature from the input data and may detect and identify general objects (e.g., vehicles or lanes) according to a trained model. In this case, the detector 140 may detect and identify an object and may provide a bounding box and a label for the detected object as shown in the detection results 141. The detector 140 may add the bounding box and the label to a traffic light in the input image 131 as shown in the detection results 141 and may also express a result of the target image 132 with the bounding box and the label in the detection results 141.

Figure 7:
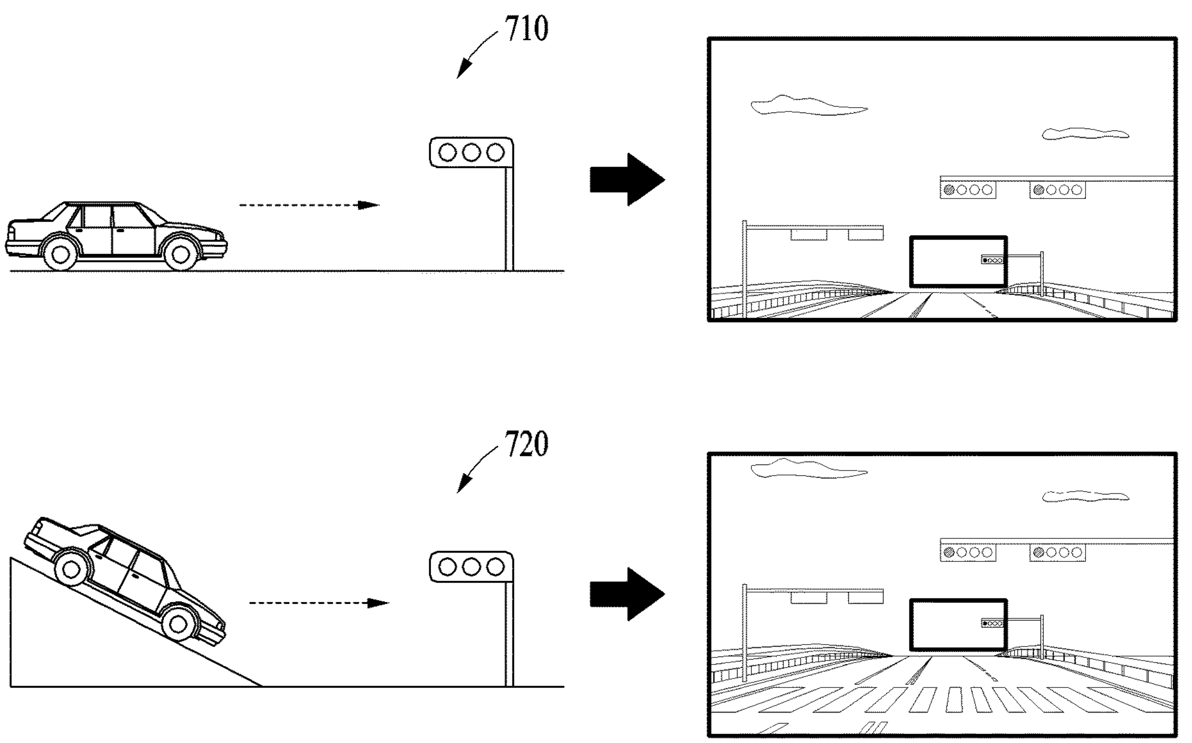
FIG. 7 illustrates an example of an input image in which an RoI is changed, according to one or more embodiments.

FIG. 7 illustrates an example input image in which an RoI is changed, according to one or more embodiments.

The description provided with reference to FIGS. 1A to 2 and 4 is generally applicable to FIG. 7.

Referring to FIG. 7, an autonomous vehicle may drive on a flat surface 710 or a sloped surface 711. The prior knowledge 102 may not readily include distribution data of all target traffic lights observed by a vehicle driving on the slope surface 720. That is, the statistically expected RoIs of traffic lights may not align with the input image. Accordingly, based on the first RoIs 411, 412, and 413 of a vehicle driving on the flat surface 710, the processor 1030 may calibrate/adjust the first RoIs 411, 412, and 413 by using data from sensors (e.g., a gyro sensor) included in the autonomous vehicle. For example, when the autonomous vehicle is driving downward, like on the slope surface 720, a target traffic light may be observed at a higher image position than that of the target traffic light observed from the flat surface 710. Accordingly, the RoI estimator 110 may calibrate/move the first RoIs 411, 412, and 413 upward (relative to the input image) based on the gyro sensor data received when on the slope surface 720. Any method of alignment may be used. For example, visual cues, path plans, environment models, etc.

Figure 8A:
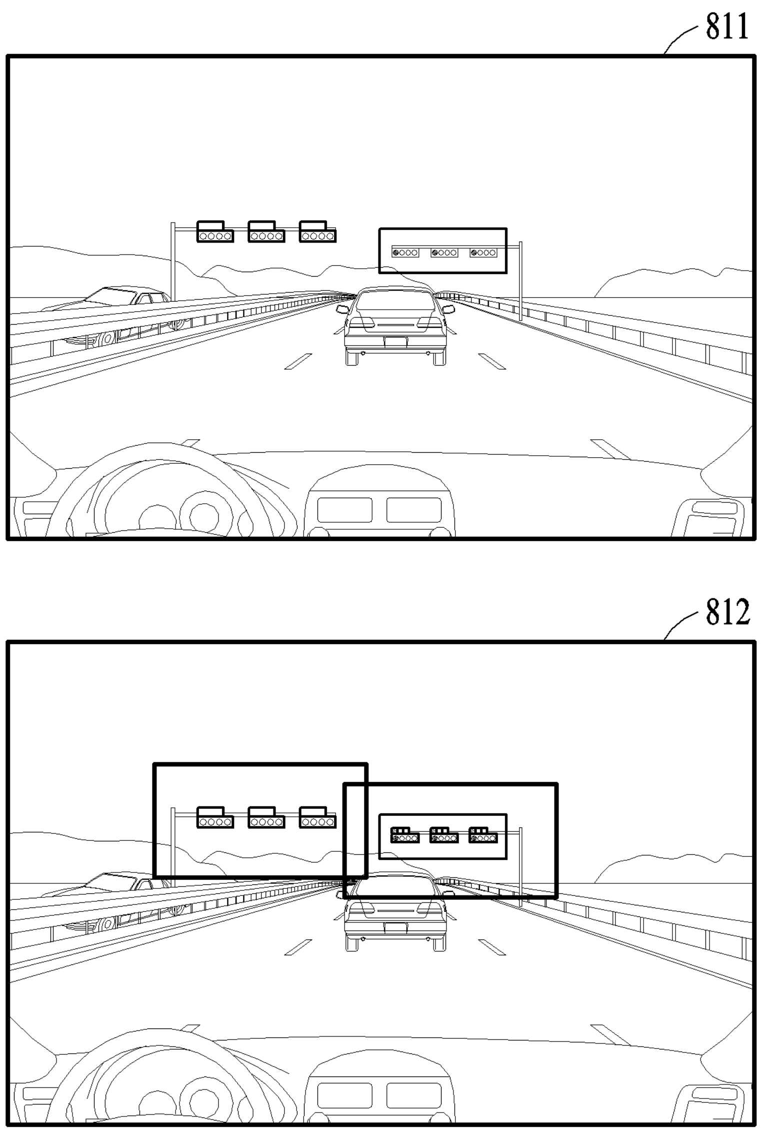
FIGS. 8A and 8B each illustrate an example of the traffic light detection results, according to one or more embodiments.
Figure 8B:
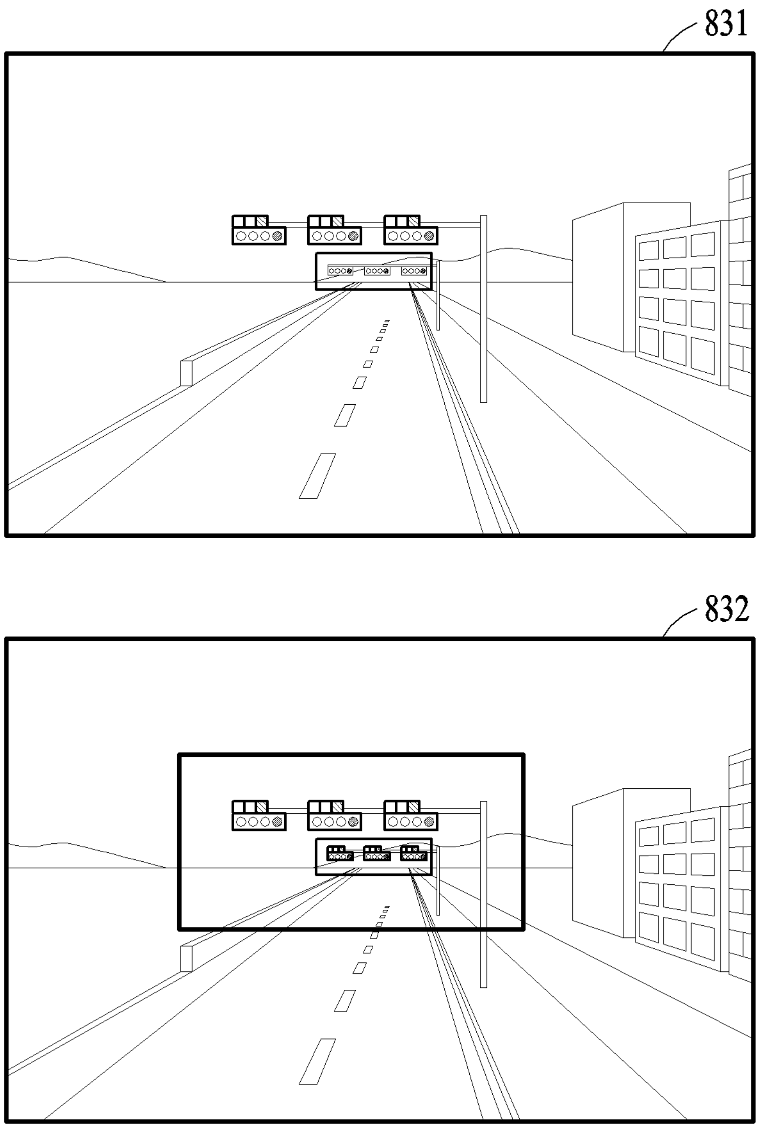

FIGS. 8A and 8B each illustrate an example of traffic light detection results, according to one or more embodiments.

The description provided with reference to FIGS. 1A to 7 is generally applicable to FIGS. 8A and 8B.

Referring to FIGS. 8A and 8B, when the processor 1030 detects a traffic light by inputting only an input image to the detector 140, detection results 811 and 831 where no target traffic lights are detected may be output. In this case, an autonomous vehicle may not readily respond to a changing traffic environment in real time. However, when the processor 1030 generates a target image through an RoI designated input image by using the RoI estimator 110 and detects a traffic light by inputting the target image together with the input image to the detector 140, detection results 812 and 832 where target traffic lights are detected may be output.

Figure 9:
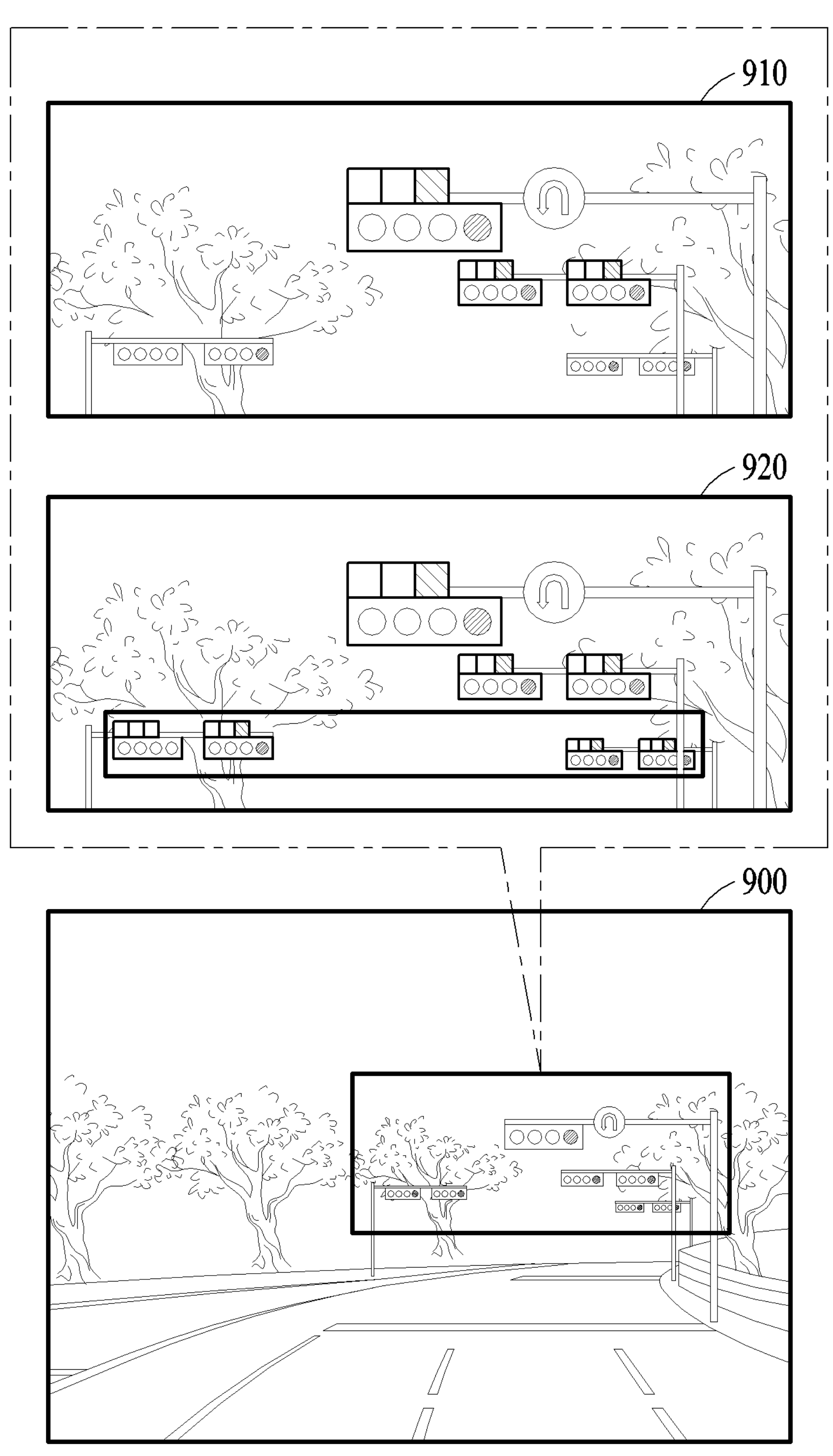
FIG. 9 illustrates an example of a comparison of the traffic light detection results, according to one or more embodiments.

FIG. 9 illustrates an example comparison of traffic light detection results, according to one or more embodiments.

The description provided with reference to FIGS. 1A to 8B is generally applicable to FIG. 9.

Referring to FIG. 9, as illustrated in FIGS. 8A and 8B, when an original image 900 is input to the detector 140 prior to applying the RoI estimator 110 in operation 910, the processor 1030 may detect target traffic lights with some of the target traffic lights missing or may not detect the target traffic lights at all. As shown in the original image 900, a target traffic light that may be seen by a human eye may become too small to be verified or may not be distinguished from the background because sufficient pixels are not secured in a camera. However, when inputting a target image and the original image 900 to the detector 140 after applying the RoI estimator 110, the target image generator 120, and the image aggregator 130 in operation 920, all the target traffic lights may be detected and even labels thereof may be output.

FIG. 10 illustrates an example electronic device, according to one or more embodiments.

Referring to FIG. 10, an electronic device 1000 may include a processor 1030, a memory 1050, and an output device 1070 (e.g., a display). The processor 1030, the memory 1050, and the output device 1070 may be connected to one another through a communication bus 1005. The processor 1030 may be any of, or any combination of, different types of processors, which are mentioned below.

The output device 1070 may display an input image where an RoI is designated by the processor 1030 and traffic light detection results together with a user interface.

The memory 1050 may store an object recognition model performed in the processor 1030. In addition, the memory 1050 may store various pieces of information generated in the process of the processor 1030 described above. In addition, the memory 1050 may store various pieces of data, programs, and the like. The memory 1050 may include a volatile memory or a non-volatile memory. The memory 1050 may include a massive storage medium, such as a hard disk, and store the various pieces of data.

In addition, the processor 1030 may perform at least one method described with reference to FIGS. 1 to 9 or an algorithm corresponding to the at least one method. The processor 1030 may be a data processing device implemented by hardware including a circuit having a physical structure to perform desired operations. For example, the desired operations may include code or instructions in a program. The processor 1030 may be implemented as, for example, a central processing unit (CPU), a graphics processing unit (GPU), or a neural network processing unit (NPU). The hardware-implemented electronic device 1000 may include, for example, a microprocessor, a CPU, a processor core, a multi-core processor, a multiprocessor, an ASIC, and a FPGA.

The processor 1030 may execute a program and control the electronic device 1000. The code of the program executed by the processor 1030 may be stored in the memory 1050.

The computing apparatuses, the vehicles, the electronic devices, the processors, the memories, the image sensors, the vehicle/operation function hardware, the ADAS/AD systems, the displays, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An operating method of an object recognition model configured to recognize traffic light objects, the operating method comprising:

obtaining an input image from a camera comprised in a vehicle, the input image among frames, including previous frames, captured by the camera;

estimating, based on prior information about traffic light objects, a first region of interest (RoI) for the input image;

determining a second RoI based on the first RoI and based on detection results of the previous frames, wherein the detection results correspond to recognition results of recognizing traffic lights in the previous frames by the object recognition model, and wherein the determining of the second RoI comprises aggregating the detection results of the previous frames, obtaining representative centers of the detection results of the previous frames, filtering the centers, and obtaining the second RoI based on the filtered centers;

recognizing, by the object recognition model, a traffic light in the input image, wherein the recognizing is based on the input image and the second RoI; and controlling an operation of the vehicle, based on the result of the recognition.

2. The operating method of claim 1, wherein the recognizing the traffic light comprises:

obtaining a target image by extracting a portion of the input image corresponding to the second RoI; and enlarging the target image to a size corresponding to a size of the input image, wherein the recognizing by the object recognition model is further based on the enlarged target image.

3. The operating method of claim 1, wherein the prior information about traffic light objects comprises:

distribution data corresponding to a distribution of locations of previous observations of traffic lights selected based on having a size less than a threshold value.

4. The operating method of claim 3, wherein the prior information about traffic light objects further comprises information on the first RoI generated based on the distribution data.

5. The operating method of claim 1, wherein the prior information about traffic light objects comprises driving environment information on an environment in which the vehicle is driving and a specification of the camera.

6. The operating method of claim 1, wherein the estimating the first RoI further comprises adjusting the first RoI based on information from a sensor of the vehicle.

7. The operating method of claim 1, wherein the estimating the first RoI further comprises adjusting the first RoI based on a specification of the camera.

8. The operating method of claim 1, wherein the aggregating the detection results of the previous frames comprises maintaining detection results of a rolling window of the previous frames, the rolling window comprising a time window or a window defined by a number of previous frames.

9. The operating method of claim 1, wherein the determining the second RoI comprises:

obtaining a distance function between the centers;

removing centers that do not satisfy a minimum condition in the distance function; and determining the second RoI based on centers that satisfy the minimum condition.

10. An electronic device comprising:

a camera;

one or more processors; and a memory storing instructions configured to cause the one or more processors to:

obtain an input image from the camera;

estimate, based on prior information about traffic light objects, a first region of interest (RoI) for the input image;

determine a second RoI based on the first RoI and based on detection results of previous frames of the camera, wherein the detection results of the previous frames correspond to recognitions results of recognizing traffic lights in the previous frames by an object recognition model configured to recognize traffic lights;

recognize, by the object recognition model, a traffic light in the input image, wherein the recognizing is based on the input image and the second RoI; and control an operation of a vehicle, based on the result of the recognition, wherein, for determining the second RoI, the instructions are further configured to cause the one or more processors to aggregate the detection results of the previous frames, obtain representative centers of the detection results of the previous frames, filter the centers, obtain the second RoI based on the filtered centers, and determine the second RoI based thereon.

11. The electronic device of claim 10, wherein the instructions are further configured to cause the one or more processors to obtain a target image by extracting a portion of the input image corresponding to the second RoI and enlarging the target images to a size corresponding to a size of the input image and input the target image to the detector, wherein the recognizing by the object recognition model is further based on the enlarged target image.

12. The electronic device of claim 10, wherein the prior information comprises:

distribution data corresponding to a distribution of locations of previous observations of traffic lights selected based on having a size less than a threshold value; and wherein the prior information further comprises information on the first RoI generated based on the distribution data.

13. The electronic device of claim 10, wherein the electronic device is comprised in the vehicle, and wherein the instructions are further configured to cause the one or more processors to adjust the first RoI based on a sensor of the vehicle and according to a driving environment of the autonomous vehicle.

14. The electronic device of claim 10, wherein the instructions are further configured to cause the one or more processors to update the detection results of the previous frames to include the result of the recognition of the traffic light in the input image, wherein the updated detection results are used for recognizing a traffic light in a next input image captured by the camera.

15. The electronic device of claim 10, wherein the instructions are further configured to cause the one or more processors to obtain a distance function between the centers, remove the centers except for centers that satisfy a minimum condition in the distance function, and place the second RoI in relation to a remaining center that satisfies the minimum condition.

16. A method performed by a computing device, the method comprising:

receiving input images captured by a camera of a moving vehicle;

for a first of the input images, determining a first region of interest (RoI), wherein the first RoI is determined based on historical traffic light observations;

inputting, to an object recognition model configured to recognize traffic lights, the first input image and an enlargement of a region in the first input image defined by the first RoI, based on which the object recognition model infers a location of a first traffic light in the first input image;

for a second of the input images captured after the first input image, determining a second RoI, wherein the second RoI is determined based on the location of the traffic light in the first input image, and wherein the determining the second RoI comprises aggregating the detection results of the previous frames, obtaining representative centers of the detection results of the previous frames, filtering the centers, obtaining the second RoI based on the filtered centers, and determining the second RoI based on the centers of clusters of the aggregated detection results;

inputting, to the object recognition model, the second input image and an enlargement of a region in the second input image defined by the second RoI, based on which the object recognition model infers a location, in the second input image, of the first traffic light or a second traffic light; and controlling an operation of the moving vehicle based on the inferred location in the second input image.

17. The method of claim 16, further comprising:

adjusting a position of the second RoI based on the first RoI or based on the historical traffic light observations.

18. The method of claim 16, wherein the object recognition model comprises a neural network and wherein the inferred locations comprise respective bounding boxes.

* * * * *